United States Patent [19]

Chater-Lea

[11] Patent Number: 6,119,007
[45] Date of Patent: Sep. 12, 2000

[54] METHOD OF TRANSMITTING CALL INFORMATION

[75] Inventor: David Chater-Lea, Crowthorne, United Kingdom

[73] Assignee: Motorola, Inc., Schaumburg, Ill.

[21] Appl. No.: 09/032,761

[22] Filed: Feb. 28, 1998

[30] Foreign Application Priority Data

Mar. 1, 1997 [GB] United Kingdom ............... 9704317

[51] Int. Cl.$^7$ ................................................. H04Q 7/20
[52] U.S. Cl. ........................ 455/442; 455/436; 455/443
[58] Field of Search ..................................... 455/422, 436,
455/437, 438, 440, 443, 442, 518, 519,
520, 517; 370/60, 103; 375/106

[56] References Cited

U.S. PATENT DOCUMENTS

| | | | |
|---|---|---|---|
| 5,184,347 | 2/1993 | Farwell et al. | 370/94.1 |
| 5,438,565 | 8/1995 | Hemmady et al. | 370/60 |
| 5,933,787 | 8/1999 | Gilhousen et al. | 455/562 |

FOREIGN PATENT DOCUMENTS

| | | |
|---|---|---|
| 660632 | 7/1994 | European Pat. Off. . |
| 0651587A1 | 5/1995 | United Kingdom . |
| 0660632A2 | 6/1995 | United Kingdom . |

*Primary Examiner*—Dwayne D. Bost
*Assistant Examiner*—Erika A. Gary
*Attorney, Agent, or Firm*—M. Mansour Ghomeshi

[57] ABSTRACT

A method of transmitting call information includes transmitting (201), within a first cell (105), call information relating to a call taking place within the first cell (105) and transmitting (203), within a second cell (103), the call information relating to the call taking place within the first cell (105). Alternatively, the method includes transmitting (201), within a first cell (105), call information relating to a first call taking place within the first cell (105) and transmitting (205), within the first cell (105), call information relating to a second call taking place within the second cell (103).

21 Claims, 2 Drawing Sheets

METHOD OF TRANSMITTING CALL INFORMATION

FIELD OF THE INVENTION

This invention relates generally to communication systems, including but not limited to transmission of call information in communication systems.

BACKGROUND OF THE INVENTION

Typically, a multiple-site trunked radio frequency (RF) communication system includes communication units, communication sites, communication resources, and a communication resource allocator, also known as a central controller, site controller, or zone controller, which may reside within base stations or repeaters located at the communication sites. Each site has a substantially distinct coverage area and is geographically located within the system. A number of communication resources are assigned to each site, where at least one of the communication resources is used as a control channel, while the remaining communication resources are used as voice and/or data channels, hereafter referred to simply as channels. The base stations or repeaters are used to generate the communication resources and are located at the site. The communication resources include, among other media, telephone connections, TDM time slots, spreading patterns, carrier frequencies, and/or frequency pairs. Some communication systems are wide-area communication systems and comprise many communication sites, which may be grouped into communication zones to more effectively allocate the communication resources among the communication units.

The communication units, also called subscribers or subscriber units, are often arranged in talkgroups and may be located anywhere within the system (in the coverage area of any site) when communicating within the system. When a communication unit from a talkgroup requests a group call, the communication unit transmits, via the control channel of the site in which it is located, an inbound signalling word (ISW) to the central controller or other controlling entity. A group call allows all members of the same talkgroup that are located within the system to communicate with each other. The ISW generally comprises the requesting communication unit's individual identification number, the requesting communication unit's talkgroup, and a request for a group call. The ISW may contain more or less information, depending on the system.

Upon receiving the ISW, the central controller determines if there is an available channel to allocate for each site in which a member of the talkgroup presently is registered. If a channel is available in each of these sites, the central controller will place the group call and transmits an outbound signalling word (OSW) to the requesting communication unit and each member of the talkgroup. If a channel is not available in each of these sites, the central controller will not place the group call and instead transmits an outbound signalling word (OSW) to the requesting communication unit. The central controller may try to convert this request into an active call at a later time when resources are available.

At times, when a mobile communication unit is active in a group or individual call, the communication unit travels out of the coverage area of its current site, causing the call to become degraded and even lost. The call may be handed off to another site for completion before much degradation or loss. Many different methods of call hand off exist. Typically, the communication unit tunes to a control channel and issues an ISW at a new site. If communication resources are available at the new site, a new resource is assigned, a channel grant is issued, and the communication unit continues the call on the new resource. If communication resources are presently assigned for the call at the new site, an OSW is issued to that effect, and the communication unit continues the call on the presently assigned resources. In general, call handoff can delay communications and utilises valuable bandwidth.

Some communication units have used a fixed rule or criterion for selecting a new site for a call handoff, such as a single signal quality threshold. A fixed rule, however, does not provide for adaptability to changing system conditions or any other dynamic criterion.

Accordingly, there is a need for a method of call handoff by a communication unit that is flexible and adaptable, yet does minimises delays and bandwidth utilisation.

DESCRIPTION OF A PREFERRED EMBODIMENT

Figure 1:
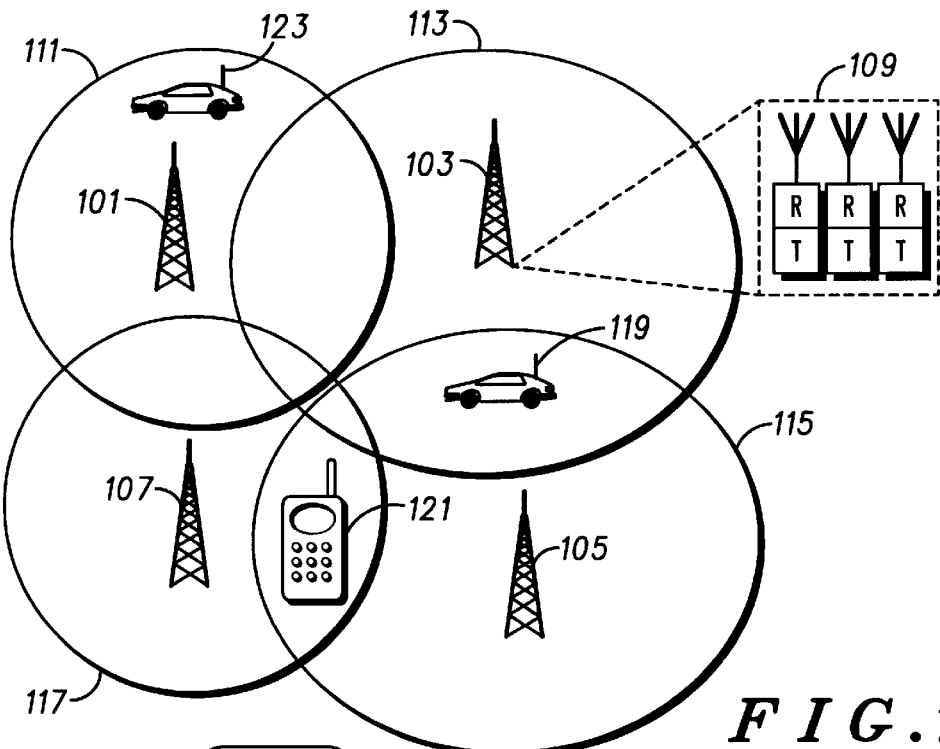
FIG. 1 is a block diagram of a communication system in accordance with the invention.

The following describes a method of transmitting call information to facilitate quick call handoff without utilising bandwidth. The method comprises transmitting call information on a cell for calls that are active in the cell as well as for calls that are not active in the cell. The call information may include identifications of various cells in which the call is active, including identifications of cells adjacent to the cell. Transmission of such information aids in call handoff that does not require a communication unit to exchange signalling, such as ISWs and OSWs, with either the cell in which the communication unit presently resides or with the cell with which the communication unit continues the call.

A method of transmitting call information comprises transmitting, within a first cell, call information relating to a call taking place within the first cell and transmitting, within a second cell, the call information relating to the call taking place within the first cell, wherein the first cell is not the second cell. Alternatively, the method comprises transmitting, within a first cell, call information relating to a first call taking place within the first cell and transmitting, within the first cell, call information relating to a second call taking place within a second cell, wherein the first cell is not the second cell.

Additional features may also be incorporated. The method may further comprise the steps of receiving from the first cell, by a communication unit engaging in the first call within the first cell, call information relating to the first call taking place in the second cell and continuing, by the communication unit, the first call within the second cell without exchanging signalling with the first cell. In addition, the communication unit may continue the first call within the second cell without exchanging signalling with the second cell. Likewise, a resource allocator may allocate at least one communication resource for the first call such that a communication unit engaging in the first call receives from the second cell the call information related to the first call without interfering with the communication unit's ability to engage in the first call within the first cell. When the first call is active in a plurality of cells in a communication system including the first cell, the call information relating to the first call may include an identification of each of the plurality of cells. The second cell may be adjacent to the first cell. The first cell may be a serving cell to one or more communication units active in the first call, and the second cell may be an inactive cell or a non-serving cell, i.e., a cell that is not a serving cell to any communication units active in the first call.

Call information relating to at least one call taking place within a cell adjacent to the first cell (neighbour cell), wherein the at least one call is not taking place within the first cell, may be transmitted within the first cell. Call information relating to all calls taking place within cells in a communication system including the first cell may be transmitted within the first cell. Call information relating to the first call taking place within the first cell may be transmitted within at least one cell adjacent to the first cell. Call information relating to the first call taking place within the first cell may be transmitted within the first cell.

A block diagram of a communication system is shown in the diagram of FIG. 1. The communication system is comprised of a plurality of sites 101, 103, 105, and 107. Each of these sites is comprised of one or more base stations or repeaters 109. Each of the sites 101, 103, 105, and 107 has a respective coverage area 111, 113, 115, and 117 associated with the site. Three communication units 119, 121, and 123 are shown within the coverage area of the communication system. The present invention is utilized, inter alia, when a communication unit 119 travels throughout the communication system and may from time to time need to have a call handed off from one site 105 to another site 101, 103, or 107.

Figure 2:
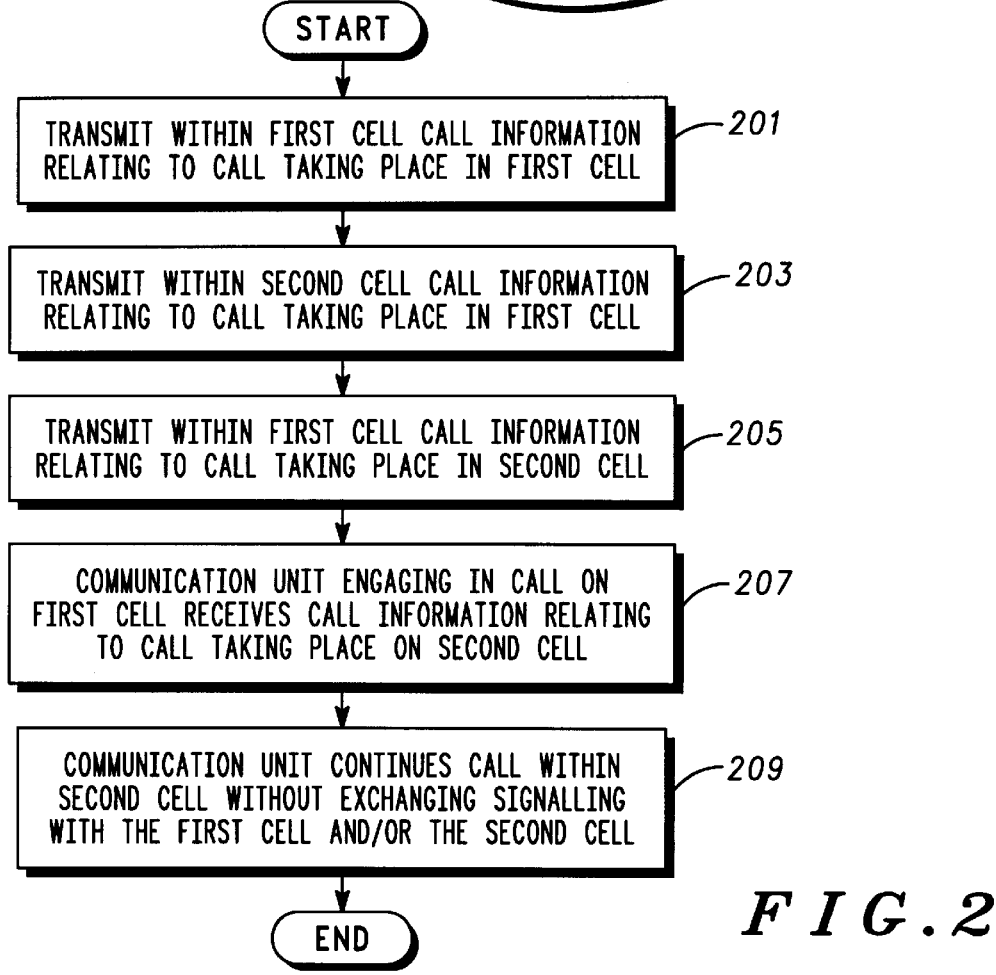
FIG. 2 is a flowchart showing a method of transmitting call information in accordance with the invention.

A flowchart showing a method of transmitting call information is shown in FIG. 2. At step 201, call information relating to a call taking place within a first cell 105 is transmitted within the first cell 105. At step 203, if desired as a feature, call information relating to the call taking place within the first cell 105 is transmitted within a second cell 103. At step 205, if desired as a feature, call information relating to the call taking place within the second cell 103 is transmitted within the first cell 105. In addition, call information relating to another (different) call taking place within the second cell 103 may also be transmitted within the first cell 105.

Additional optional steps of the method of the present invention include steps 207 and 209. At step 207, a communication unit 119 engaging in the call within the first cell receives from the first cell 105 call information relating to the call taking place in the second cell 103. At step 209, the communication unit 119 continues the first call within the second cell 103 without exchanging signalling with the first cell 105. In addition, the communication unit may continue the first call within the second cell 103 without exchanging signalling with the second cell 103. In general, exchanging signalling refers to the relay of messages between a communication unit and a communication system's infrastructure, such as is typically engaged in when a call handoff is performed or when moving between cells when not engaged in a call. A communication unit that needs to migrate to a new cell while taking part in a group call may move directly to the communication resource used by that group call in the new cell. As a result, the user's service is not interrupted by having to exchange signalling to obtain details of the traffic allocation for a new cell.

Call information includes call details such as talkgroup identifications (IDs), user IDs, and call IDs. In the preferred embodiment, cell IDs where the call is presently taking place (i.e., serving cells) are included in the call information. In the preferred embodiment, the call information is transmitted on a control communication resource. Also in the preferred embodiment, the call information sent out for a call is the same information transmitted within all cells in which the information is transmitted.

Figure 3:
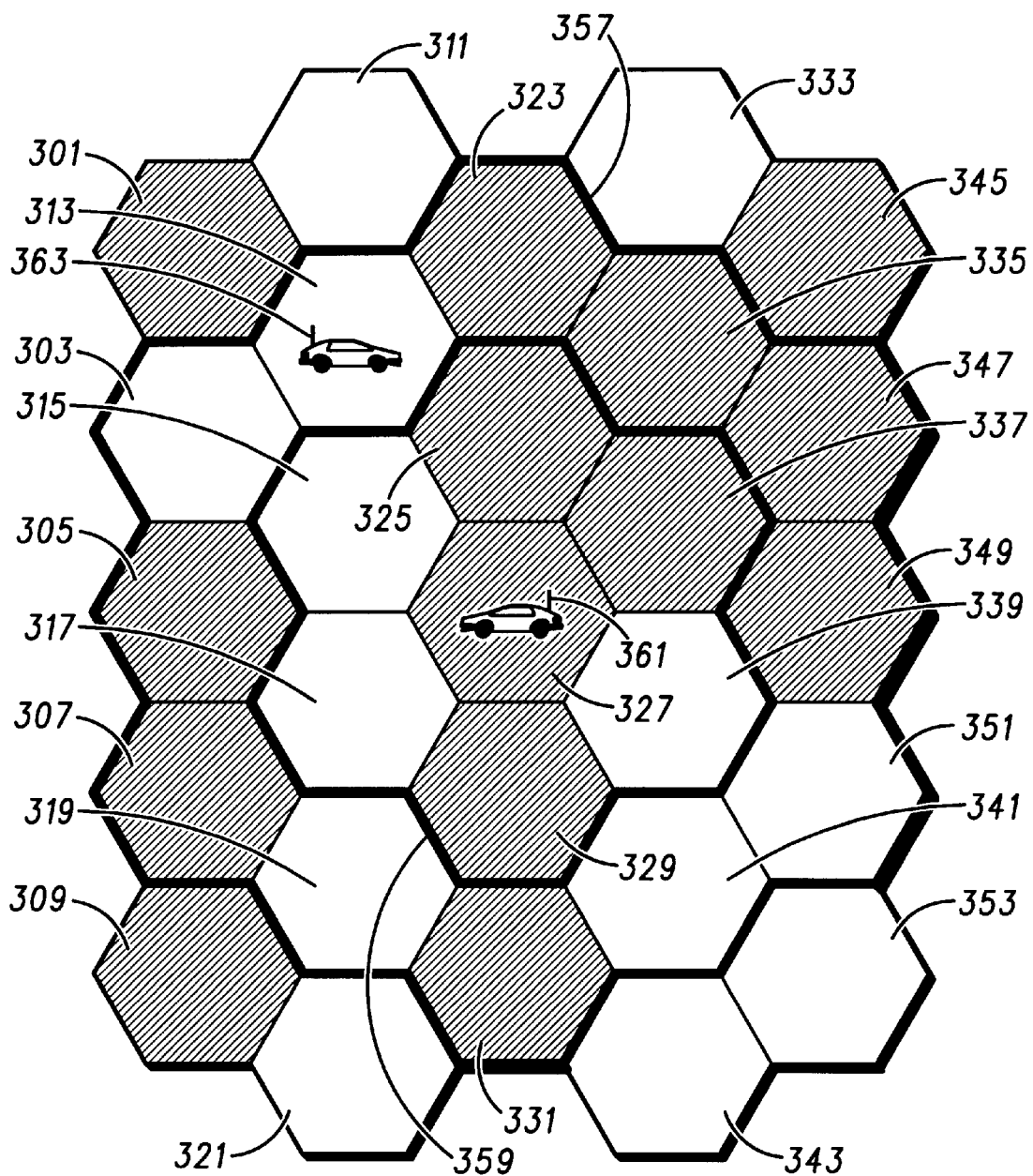
FIG. 3 is a block diagram of a communication system showing serving cells for a call in accordance with the invention.

A block diagram of a communication system showing serving cells for a call is shown in FIG. 3. A plurality of cells 301 through 353 comprise the system. For the sake of simplicity, a non-overlapping hexagon shape is used for the shape of the coverage area, although coverage areas typically overlap and are not hexagonal in shape. In the system shown in FIG. 3, a call is active in a plurality of cells 301, 305, 307, 309, 323, 325, 327, 329, 331, 335, 337, 345, 347, and 349, which cells are referred to as active cells. The call is not active in cells 303, 311, 313, 315, 317, 319, 321, 333, 339, 341, 343, 351, and 353, which cells are referred to as inactive cells.

If, for example, a communication unit 361 is engaging in a call in cell 327, which is the serving cell for the communication unit 361 at this time, and is travelling toward cell 335, the communication unit 361 may receive call information on the call on cells 325 and 337 to help determine which cell would better carry the call for the communication unit 361 as it travels. If call information for a call is transmitted within all cells adjacent to a serving cell or an active cell for the call, a communication unit will better be able to effectuate a call handoff without interacting with the system's infrastructure. For example, adjacent cells to serving cell 327 fall within border 359 and include cells 315, 317, 325, 329, 337, and 339. Thus, the communication unit may travel in any direction and will still be able to receive information on the call. If a system is set up in an area where it is possible for a communication unit 361 to quickly pass through two or more cells, it may be desirable to transmit call information within cells adjacent to cells adjacent to a serving cell 327 (or an active cell), such as those shown within the border 357. Call information for a particular call may be transmitted within each cell in the system, which information identifies the cells that are the active cells. Further, call information for all presently ongoing calls may be transmitted within each cell in the system, which information identifies the cells that are the active cells for each particular call. Thus, call information may be transmitted within active cells or inactive cells or within serving cells or non-serving cells for a call.

In the preferred embodiment, a resource allocator allocates communication resources such that a communication unit engaging in the first call receives from the second cell the call information related to the first call without interfering with the communication unit's ability to engage in the first call within the first cell. If the communication system is aware that communication units may be able to decode messages from more than one adjacent or nearby cell, the resource allocator for the communication system may deliberately allocate the communication resources in such cells to ease the ability of the communication unit to both check signals in the cells, and to apply diversity reception in such cells. For example, the allocation may be made in different time slots, as in a Time Division Multiple Access (TDMA) system, optimally orthogonal spreading codes as in a Code Division Multiple Access (CDMA) system, intermodulation free frequencies, as in a Frequency Division Multiple Access (FDMA) system, or some other optimum allocation.

If the communication unit is able, for example by means of an extra receiver(s), by use of a different time slot, or by use of a different spreading code, or some other means, to receive the call information in a second cell while engaging in the call in its serving cell, the communication unit may make use of the combined information from all cells to obtain diversity reception (in frequency, and/or space, and/or time) to provide the best possible quality of signal to its user.

A communication unit may be registered on one cell, even though a second cell provides better signal quality. This situation may exist for a number of reasons, such as: a) a second cell has not reached sufficient improvement over the first cell for cell reselection to occur (i.e., within a signal hysteresis threshold); b) a second cell may be restricting access by broadcast of parameters requiring a higher signal strength before access is permissible than the communication unit is currently receiving; c) the communication unit may be programmed to prefer a serving cell if the signal is usable, even if a nearby cell provides a better signal (for example, for traffic distribution, resilience in event of fallback, and so forth). The call may still be carried at the second cell if other members of the group are present in the second cell. In this situation, when practising the present invention, the communication unit has the ability check the quality of signal of the traffic allocation in the second cell, and listen to the group call in that cell if better performance is obtained than using the traffic allocation in the serving cell. The communication unit then returns to its serving cell on completion of the call, or should the communication unit enter into transmit mode. Thus the communication unit registration remains on the serving cell. Thus, the present invention provides in an improved call quality in this situation.

The present invention is thus able to provide a communication unit with a way to improve signal quality without requiring a signal exchange with the communication system. Further, a communication unit is better able to pick the best available communication resource for handing off a call. The present invention also provides for a communication system to make better use of system resources. If a communication unit needs to leave a cell whilst engaged in a call, and is able to make a decision concerning which cell to move to, the communication unit may use the information, concerning which other cells are presently active in the call, transmitted by its present cell, and may therefore choose to utilise another cell in which the call is already active in preference to a cell in which the call is not active. By providing a communication unit with the ability to reuse an allocated resource and not requiring an addition resource to be allocated, system resources are conserved.

Another advantage is that the communication unit may not suffer an interruption in service because the communication unit immediately joins the call in its chosen new cell, whereas if the communication unit chose to move to a cell where the call is currently active, service may be interrupted to signal to the infrastructure, and service would continue to be interrupted until the infrastructure is able to allocate a resource in this new cell. This advantage is illustrated in an example using the system shown in FIG. 3. If the communication unit 361 is engaged in the call whilst moving from cell 327 in the direction of cell 349, the communication unit may be able to obtain service in either cell 337 or cell 339 when leaving cell 327. By utilising the information concerning the call and cells in which the call is carried being as transmitted from cell 327, the communication unit 361 is able to seek service from cell 337, where the call is already active, in preference to cell 339 in which the call is not active, therefore providing a user of a communication unit with both a lesser interruption in service and conservation of system resources.

What is claimed is:

1. A method comprising:
    transmitting, within a first cell, call information relating to a call taking place within the first cell;
    transmitting, within a second cell, the call information relating to the call taking place within the first cell, wherein the first cell is not the second cell;
    receiving from the first cell, by a communication unit engaging in the call within the first cell, call information relating to the call taking place in the second cell; and
    continuing, by the communication unit, the call within the second cell without exchanging signaling with the first cell.

2. The method of claim 1, wherein the second cell is adjacent to the first cell.

3. The method of claim 1, wherein the first cell is a serving cell to one or more communication units active in the call.

4. The method of claim 1, wherein the second cell is inactive in the call.

5. The method of claim 1, further comprising the step of transmitting, within the first cell, call information relating to at least one call taking place within a cell adjacent to the first cell, wherein the at least one call is not taking place within the first cell.

6. The method of claim 1, further comprising the step of transmitting, within the first cell, call information relating to all calls taking place within cells in a communication system including the first cell.

7. The method of claim 1, further comprising the step of transmitting, within at least one cell adjacent to the first cell, the call information relating to the call taking place within the first cell.

8. The method of claim 1, further comprising the step of transmitting, within all cells in a communication system including the first cell, the call information relating to the call taking place within the first cell.

9. The method of claim 1, wherein the call is active in a plurality of cells in a communication system including the first cell, and wherein the call information includes an identification of each of the plurality of cells.

10. The method of claim 1, further comprising the step of allocating, by a resource allocator, at least one communication resource for the call such that a communication unit engaging in the call receives from the second cell the call information related to the call without interfering with the communication unit's ability to engage in the call within the first cell.

11. The method of claim 1, wherein the communication unit continues the call within the second cell without exchanging signalling with the second cell.

12. A method comprising:
    transmitting, within a first cell, call information relating to a first call taking place within the first cell;
    transmitting, within the first cell, call information relating the first call taking place within a second cell, wherein the first cell is not the second cell and
    receiving from the first cell, by a communication unit engaging in the first call within the first cell, call information relating to the first call taking place in the second cell; and
    continuing, by the communication unit, the first call within the second cell without exchanging signaling with the second cell.

13. The method of claim 12, wherein the second cell is adjacent to the first cell.

14. The method of claim 12, wherein the first cell is a serving cell to one or more communication units active in the first call.

15. The method of claim 12, wherein the second cell is not a serving cell to any communication units active in the first call.

16. The method of claim 12, further comprising the step of transmitting, within the first cell, call information relating to at least one call taking place within a cell adjacent to the first cell, wherein the at least one call is not taking place within the first cell.

17. The method of claim 12, further comprising the step of transmitting, within the first cell, call information relating to all calls taking place within cells in a communication system including the first cell.

18. The method of claim 12, further comprising the step of transmitting, within at least one cell adjacent to the first cell, the call information relating to the first call taking place within the first cell.

19. The method of claim 12, further comprising the step of transmitting, within all cells in a communication system including the first cell, the call information relating to the first call taking place within the first cell.

20. The method of claim 12, wherein the first call is active in a plurality of cells in a communication system including the first cell, and wherein the call information relating to the first call includes an identification of each of the plurality of cells.

21. The method of claim 12, further comprising the step of allocating, by a resource allocator, at least one communication resource for the first call such that a communication unit engaging in the first call receives from the second cell the call information related to the first call without interfering with the communication unit's ability to engage in the first call within the first cell.

* * * * *